United States Patent
Maimets

[19]

[11] Patent Number: 6,138,718

[45] Date of Patent: Oct. 31, 2000

[54] APPARATUS AND METHOD FOR REPAIRING PRESSURE PIPES

[75] Inventor: Lembit Maimets, Richmond Hill, Canada

[73] Assignee: Link-Pipe (H. K.), Ltd., Kowloon, The Hong Kong Special Administrative Region of the People's Republic of China

[21] Appl. No.: 09/182,224

[22] Filed: Oct. 30, 1998

[51] Int. Cl.[7] ...................................................... F16L 55/18
[52] U.S. Cl. ........................ 138/98; 138/97; 405/150.1; 264/269
[58] Field of Search .................... 138/98, 97; 405/150.1; 264/269; 156/287

[56] References Cited

U.S. PATENT DOCUMENTS

| | | | |
|---|---|---|---|
| 4,346,922 | 8/1982 | Ohtsuga et al. | 138/97 X |
| 4,976,290 | 12/1990 | Gelin et al. | 138/98 X |
| 5,042,532 | 8/1991 | Gilleland | 138/98 |
| 5,119,862 | 6/1992 | Maimets et al. | 138/98 |
| 5,186,897 | 2/1993 | Imoto et al. | 138/98 X |
| 5,334,429 | 8/1994 | Imoto et al. | 138/98 X |
| 5,351,720 | 10/1994 | Maimets et al. | 138/98 |
| 5,560,395 | 10/1996 | Bissonnette et al. | 138/98 |
| 5,725,026 | 3/1998 | Maimets | 138/97 |
| 5,857,494 | 1/1999 | Tsukamoto et al. | 138/98 X |
| 5,868,169 | 2/1999 | Catallo | 138/98 |

FOREIGN PATENT DOCUMENTS

| | | | |
|---|---|---|---|
| 29604954 | 5/1996 | Germany. | |
| 141420 | 11/1979 | Japan | 138/98 |
| 2186253 | 8/1987 | United Kingdom. | |
| 90/05267 | 5/1990 | WIPO. | |
| 98/55795 | 12/1998 | WIPO. | |

OTHER PUBLICATIONS

WO 93/18334 Method and Apparatus for Repairing Conduits Lembit Maimets, Sep. 1993.

*Primary Examiner*—Patrick Brinson
*Attorney, Agent, or Firm*—Greenblum & Bernstein, P.L.C.

[57] ABSTRACT

The present invention relates to an apparatus and method for repairing pipes and conduits, particularly high-pressure pipes and conduits, such as natural gas lines, water lines, and steam lines. The conduit repair apparatus includes a sleeve having an outer surface. outwardly flared end portions, a pair of longitudinal edges and a locking structure to lock the sleeve into a tubular configuration within an inner surface of a host pipe to be repaired. A resilient, compressible gasket is adapted to be applied over the outer surface of the sleeve, and a sealing membrane is adapted to be applied over the outer surface of the resilient, compressible gasket. A curable sealant is adapted to be applied over the sealing membrane, and the sealant is pressed by the resilient, compressible gasket between the outer surface of the sleeve and the inner surface of the host pipe while the sealant is cured. The resilient, compressible gasket may be formed as a layer of closed cell polyethylene or polyurethane foam. The curable sealant may include an epoxy, a polyester or a polyurethane, and an outer fiber mesh layer can be applied over sealant, wherein the fiber mesh permits easier handling and enables spreading of the sealant through openings in the mesh for more uniform spreading of the sealant into contact with the host pipe.

46 Claims, 5 Drawing Sheets

APPARATUS AND METHOD FOR REPAIRING PRESSURE PIPES

CROSS-REFERENCE TO RELATED PATENTS

This application hereby incorporates by reference in their entireties the disclosures of the following two U.S. Pat. No. 5,119,862, issued on Jun. 9, 1992, and U.S. Pat. No. 5,351,720, issued on Oct. 4, 1994.

BACKGROUND OF THE INVENTION

1. Field of the Invention

The present invention relates primarily to an apparatus and method for repairing pipes and conduits, particularly relatively high-pressure pipes and conduits, such as a natural gas lines, water lines, and steam lines. More particularly, the invention is directed to an internal repair of a section of damaged, weakened, or leaking pipe or conduit, in which the section to be repaired is typically located in an inaccessible area, such as underground. Although conduit repair is an intended specific application of the invention, the apparatus and method disclosed has broader applicability and are contemplated to encompass the securing of a curable sealant to a surface and the general bonding of two surfaces together.

2. Background and Material Information

Conduit systems for conveying natural gas, water, and steam are typically located underground and, in general, are not easily accessible if repair or other maintenance is required after installation. Over a period of time, such conduit systems can become damaged, weakened, or can otherwise begin to leak, particularly at the joints between adjacent conduit sections, but also longitudinally along sections of the conduit. Thus, there can be a problem of ex-filtration of gas, water or steam from the damaged conduit sections. Additionally, old leaded joints in a water line must be isolated to prevent leaching of lead into drinking water.

Furthermore, in the repair of relatively high-pressure pipes and conduits, such as natural gas lines, water lines, and steam lines, which are utilized by utility companies, there is usually a need to effect the repairs in as short a time period as possible. Thus, there is a need to effect high strength repairs to such relatively high-pressure pipes and conduits quickly so that the utility lines can be returned to service in a relatively short period of time, such as less than one day.

Additional problems associated with such systems, and a number of previous repair methods and apparatuses are disclosed, for example, in U.S. Pat. Nos. 5,119,862 and 5,351,720. These patents, which disclose "No-Dig" or non-excavation repairs, utilize a sleeve or liner which is transported to the site of the weakened or damaged pipe in a coiled or partially coiled configuration. Once the repair liner is located in the necessary position at the site of the repair, internal pressure is applied to the sleeve by means of an inflatable bladder or other means, which causes the sleeve to begin to uncoil and expand in the direction of the "host" pipe to be repaired. The sleeve, which includes a gasket or sealing compound on its outer surface, reaches a slight over-expanded condition, whereby the liner compresses the gasket or sealing compound against the inner surface of the host pipe. The internal pressure is then reduced or removed and the sleeve is slightly recoiled, whereby overlapping edges of the sleeve become locked in place by virtue of complementary locking devices.

The methods and apparatus disclosed in the aforementioned patents are intended primarily for the repair of conduits that carry wastewater and other fluids that are not in an over-pressure environment. However, a high-pressure pipe, such as a natural gas line, a water line, or a steam line, also requires periodic repair, particularly for sealing against ex-filtration, i.e., against a leak of the fluid, such as natural gas, steam, or water, from the inside to the outside of the pipe. In addition, old leaded joints in a water line must be isolated to prevent the leaching of lead into drinking water.

The methods and apparatus disclosed in the aforementioned patents are useful for the repair of high-pressure pipes, although a particular problem, explained below, is posed. The size of these pipes is typically between 4 inches and 36 inches in diameter or even greater. Unlike an elastic compressible gasket or a polyurethane foam, e.g., which are usable for the repairs described in U.S. Pat. No. 5,351,720, high-pressure or over-pressure pipes and conduits require sealants that cure into a concrete-like hardness and which are not compressible. Such resins, unlike compressible or foam sealants, do not expand as they cure. Instead, they more or less retain their initial liquid volume. Thus, when an expandable repair sleeve having a curable sealant is positioned within a host pipe, expanded by the pressurizing device to compress the sealant into engagement with the inner surface of the host pipe, and subsequently the pressurizing device is retracted to allow the locking members of the inner sleeve to lock the sleeve into a tubular configuration, a gap is often formed when the inner sleeve contracts and pulls the curable sealant with it. This gap greatly reduces the strength of the repair, and depending on the location of the gap, the fluid conveyed within the conduit may ex-filtrate through the gap, or the pressure of the fluid may cause the repair sleeve to fracture in the area of the gap which would also allow the fluid to ex-filtrate through the repaired section.

SUMMARY OF THE INVENTION

One aspect of the present invention is to provide for an apparatus and method for repairing high or over-pressure pipes and conduits, particularly high or over-pressure pipes and conduits, when an epoxy or other curable, non-expansible sealant is utilized in the repair.

More particularly, another aspect of the present invention is to provide for the repair of pipes and conduits with a sleeve or liner that is self-locking according to known methods, per se, but which prevents the creation of a gap between the repair sleeve and the host pipe.

According to one particular embodiment of the invention, a resilient, compressible gasket is placed upon the sleeve together with a sealing membrane which carries the curable sealant. Thus, when the sleeve is expanded against the inside of the host pipe, the resilient, compressible gasket is compressed, and the pressure created thereby is transferred to the sealing membrane and curable sealant. The pressurized sealing membrane and curable sealant are then pressed between the sleeve and the host pipe, thereby flowing to fill any empty space and to prevent the creation of a gap between the sleeve and the host pipe.

Thus, even after the internal pressure is removed from the interior of the repair sleeve of the present invention, once the sleeve has assumed its locked position, the pressure of the resilient, compressible gasket is maintained so that the curable sealant completely fills the annular space between the sleeve and the host pipe. This allows rapid positioning of the repair sleeve by a known positioning and pressurizing device, pressurizing to effect the repair, contraction of the pressurizing device, and withdrawal of the positioning and pressurizing device while the curable sealant cures so that the device can be fitted with another repair sleeve and quickly maneuvered to effect another repair at a different location. Accordingly, utilizing the repair apparatus of the present invention and/or the repair method of the present invention results in greatly reduced times for repairing high pressure conduits and permits quick return to service for the repaired conduits.

Additionally, in another aspect of the present invention, a plurality of repair sleeves can be simultaneously positioned by known positioning and pressurizing devices, simultaneously pressurized to effect the repairs, all the pressurizing devices can then be simultaneously contracted and withdrawn, while the curable sealant cures, so that the devices can be fitted with other repair sleeves and quickly maneuvered to effect other repairs at different locations. This results in even greater time savings and more rapid return of the conduits to service.

According to another aspect of the invention, in the environment of water mains conveying potable water, the repair sleeve according to the invention can be installed over joints of conduit sections, where such conduit systems are of the type which was initially installed with leaded joints, in order to isolate such joints and prevent lead from leaching into the potable water.

In addition to the applicability of the invention for pipe repair, the invention encompasses other fields of endeavor as well, whereby a hardenable, curable sealant is used between two members in order to prevent the creation of an air gap between the two members during the curing of the sealant. These members could be curved, comparable to the above-mentioned sleeve and host pipe, planar, or other shape.

With reference to the foregoing, the present invention includes an apparatus for repairing pipes and conduits, particularly high-pressure pipes and conduits, such as natural gas lines, water lines, and steam lines. The conduit repair apparatus includes a sleeve having an outer surface and a pair of longitudinal edges and a locking structure to lock the sleeve into a tubular configuration within an inner surface of a host pipe to be repaired. A resilient, compressible gasket is adapted to be applied over the outer surface of the sleeve, and a sealing membrane is adapted to be applied over the outer surface of the resilient, compressible gasket. A curable sealant is adapted to be applied over the sealing membrane, and the sealant is pressed by the resilient, compressible gasket between the outer surface of the sleeve and the inner surface of the host pipe while the sealant is cured.

In another aspect of the present invention, the conduit repair apparatus includes a sleeve having an outer surface and a pair of longitudinal edges and a locking structure to lock the sleeve into a tubular configuration within an inner surface of a host pipe to be repaired, and a resilient, compressible gasket is adapted to be applied over the outer surface of the sleeve. A sealing membrane is provided that includes a porous material impregnated with a curable liquid resin sealant. The membrane is applied over the outer surface of the resilient, compressible gasket, and the curable sealant is pressed by the resilient, compressible gasket between the outer surface of the sleeve and the inner surface of the host pipe while the sealant is cured.

According to another aspect of the present invention, the locking structure for the conduit repair apparatus described above can include at least one row of lock holes provided parallel to one of the pair of longitudinal edges of the sleeve, and at least one row of locking projections provided on the other of the pair of longitudinal edges of sleeve. The locking projections interengage with the lock holes upon expansion of the sleeve to a position to cause the resilient, compressible gasket to press the sealant between the outer surface of the sleeve and the inner surface of the host pipe while the sealant is cured. The locking structure can also include a plurality of spaced rows of lock holes, and the plurality of spaced rows of locking holes can be spaced apart from one another. This permits the diameter of the sleeve to increase as the locking projections slip from one row to the next during expansion of the sleeve.

Another aspect of the present invention includes a method of repairing a conduit which includes providing a conduit repair sleeve having an outer surface, a pair of longitudinal edges and a locking structure to lock the repair sleeve into a tubular configuration within an inner surface of a host pipe to be repaired, with the repair sleeve assuming a coiled position and adapted to assume an expanded locked position. The method further includes applying a resilient, compressible gasket over the outer surface of the repair sleeve, applying a sealing membrane over the outer surface of said resilient, compressible gasket, applying a curable sealant over the sealing membrane, positioning the conduit repair sleeve within the host pipe at a site to be repaired, expanding the repair sleeve to engage the locking structure to lock the repair sleeve into a tubular configuration, to compress said resilient, compressible gasket, and to press the curable sealant between the inner surface of the host pipe and the sealing membrane, and maintaining pressure on the curable sealant during curing by outwardly directed pressure exerted by the compressed resilient, compressible gasket between the sleeve and the sealant.

In another aspect of the present invention, the method can further include applying an outer fiber mesh layer over the sealant, such that the fiber mesh permits easier handling during the repair and enables spreading of the sealant through openings in the mesh for more uniform spreading of the sealant into contact with the host pipe. Additionally, the mesh in combination with the curable sealant, which once cured, creates a member having high tensile strength capable of withstanding the internal pressures of the conduit. Accordingly, the repair sleeve including the fiber mesh can act as an independent pipe within the host pipe.

In a further aspect of the present invention, a method of repairing a conduit can further include providing a conduit repair sleeve having an outer surface, a pair of longitudinal edges and a locking structure to lock the repair sleeve into a tubular configuration within an inner surface of a host pipe to be repaired, the repair sleeve assuming a partially coiled position and adapted to assume an expanded locked position. The method further includes applying a resilient, compressible gasket over the outer surface of the repair sleeve, and applying a sealing membrane including a porous material impregnated with a curable liquid resin sealant over the outer surface of the resilient, compressible gasket, positioning the conduit repair sleeve within the host pipe at a site to be repaired. The method further includes expanding the repair sleeve to engage the locking structure to lock the repair sleeve into a tubular configuration, to compress the resilient, compressible gasket, and to press the sealing membrane and the curable liquid resin sealant between the inner surface of the host pipe and the sealing membrane, and maintaining pressure on the sealing membrane and the curable liquid resin sealant during curing by outwardly directed pressure exerted by the compressed resilient, compressible gasket between the sleeve and the sealant.

According to another aspect of the present invention, the method of repairing a conduit can further include applying an outer fiber mesh layer over the curable liquid resin sealant, such that the fiber mesh permits easier handling during the repair process and enables spreading of the curable liquid resin sealant through openings in the mesh for more uniform spreading of the curable liquid resin sealant into contact with the host pipe.

In a further aspect of the present invention, the method of repairing a conduit can also include forming locking structure to include at least one row of lock holes provided parallel to one of the pair of longitudinal edges of the sleeve, and at least one row of locking projections provided on the other of the pair of longitudinal edges of the sleeve to interengage with the lock holes upon expansion of the sleeve to a position to cause the resilient, compressible gasket to press the sealant between the outer surface of the sleeve and the inner surface of the host pipe while the sealant is cured. The method can further include forming the locking structure as a plurality of spaced rows of lock holes, and additionally spacing the rows of locking holes apart from one another, thereby permitting the diameter of the sleeve to increase as the locking projections slip from one row to the next during expansion of the sleeve.

According to other aspects of the present invention, in either the apparatus and/or the methods described above, the resilient, compressible gasket may be formed from any suitable resilient, compressible material, such as a layer of closed cell polyethylene or polyurethane foam, a layer of cross-linked polyethylene, or any other type of resilient, compressible foam or other material, such as natural or synthetic rubber having a soft consistency with a rebounding capability, which is capable of exerting pressure between an installed conduit repair sleeve and repair sealant positioned between the sleeve and a host conduit.

In further aspects of the present invention, in either the apparatus and/or the methods described above, the curable sealant may include an epoxy, a polyester or a polyurethane, and an outer fiber mesh layer can be applied over sealant, wherein the fiber mesh permits easier handling and enables spreading of the sealant through openings in the mesh for more uniform spreading of the sealant into contact with the host pipe.

The curable sealant usable in the invention can include any suitable curable sealant, and preferably comprises an epoxy, a polyester, or a polyurethane, depending upon the environment in which the invention is to be utilized. Prior to curing, the sealant is preferably in liquid form, having a predetermined viscosity. A thickening agent, if necessary, can be added to control the viscosity of the sealant. Additionally, a quantity of a hardening agent adapted to be added to the sealant, the hardening agent possibly comprising glass beads or fragments thereof According to still another aspect of the present invention, the apparatus and/or the method can additionally include a fiber mesh, in the form of a mat or sheet, such as a sheet of fiberglass mesh, a metal mesh, or any suitable mesh having a high modulus of elasticity, adapted to be applied over the curable to permit easier handling of the conduit repair apparatus, and also enable spreading of the curable sealant through the openings in the mesh. This results in a more uniform spreading of the sealant into contact with the inner wall of the host pipe. Additionally, the mesh in combination with the curable sealant, which once cured, creates a member having high tensile strength capable of withstanding the internal pressures of the conduit. Accordingly, the repair sleeve including the fiber mesh can act as an independent pipe within the host pipe.

In another aspect of the present invention, the conduit repair apparatus includes a sleeve having an outer surface, a pair of longitudinal edges, an outwardly flared portion at each longitudinal end of the sleeve, and a locking structure to lock the sleeve into a tubular configuration within an inner surface of a host pipe to be repaired. A resilient, compressible gasket is applied over the outer surface of the sleeve and a curable sealant is applied over the resilient, compressible gasket. The sealant adapted to be pressed by the resilient, compressible gasket between the outer surface of the sleeve and the inner surface of the host pipe while the sealant is cured. However, in this variation, the resilient, compressible gasket and the curable sealant are positioned about the sleeve and spaced inwardly from the outwardly flared portions at each end of the sleeve to define end gasket receiving areas at each end of the conduit repair apparatus. Furthermore, the end gasket receiving areas are provided with end gaskets that encircle the sleeve and are formed of a material suitable for contact with potable water. Accordingly, once the repair apparatus is pressed into sealing engagement with the inner surface of the host pipe, the end gaskets and the inner sleeve isolate the curable sealant from a fluid flowing through the repair apparatus. The end gaskets may be formed from any suitable resilient, compressible material, such as a layer of closed cell polyethylene or polyurethane foam, a layer of cross-linked polyethylene, or any other type of resilient, compressible foam or other material, such as natural or synthetic rubber having a soft consistency with a rebounding capability, which is capable of exerting pressure between an installed conduit repair sleeve and repair sealant positioned between the sleeve and a host conduit. Although this arrangement may be utilized in the repair of natural gas lines, water lines and steam lines, when utilized for the repair of potable water lines, the end gaskets must be formed from a material which is safe and suitable for contact with potable water.

In a still further aspect of the present invention, a method of repairing a conduit includes providing a conduit repair sleeve having an outer surface, a pair of longitudinal edges, an outwardly flared portion at each longitudinal end of the sleeve, and a locking structure to lock the repair sleeve into a tubular configuration within an inner surface of a host pipe to be repaired, the repair sleeve assuming a coiled position and adapted to assume an expanded locked position. The method further includes applying a resilient, compressible gasket over the outer surface of the repair sleeve, applying a curable sealant over the resilient, compressible gasket, and the resilient, compressible gasket and the curable sealant are positioned about the sleeve and spaced inwardly from the outwardly flared portions at each end of the sleeve to define end gasket receiving areas at each end of the conduit repair apparatus.

The method also includes positioning the conduit repair sleeve within the host pipe at a site to be repaired, expanding the repair sleeve to engage the locking structure to lock the repair sleeve into a tubular configuration, to compress the resilient, compressible gasket, and to press the curable sealant between the inner surface of the host pipe and said sleeve, and maintaining pressure on the curable sealant during curing by outwardly directed pressure exerted by the compressed resilient, compressible gasket between the sleeve and the sealant. Additionally, the method of this variation includes providing the end gasket receiving areas with end gaskets suitable for contact with potable water, whereby once the repair apparatus is pressed into sealing engagement with the inner surface of the host pipe, the end gaskets and the inner sleeve isolate the curable sealant from a fluid flowing through the repair apparatus. The end gaskets may be formed from any suitable resilient, compressible material, such as a layer of closed cell polyethylene or polyurethane foam, a layer of cross-linked polyethylene, or any other type of resilient, compressible foam or other material, such as natural or synthetic rubber having a soft consistency with a rebounding capability, which is capable of exerting pressure between an installed conduit repair sleeve and repair sealant positioned between the sleeve and a host conduit. Although this arrangement may be utilized in the repair of natural gas lines, water lines and steam lines, when utilized for the repair of potable water lines, the end gaskets must be formed from a material which is safe and suitable for contact with potable water.

BRIEF DESCRIPTION OF THE DRAWINGS

Other characteristics and advantages of the invention will be better understood upon reading the description that follows and with reference to the annexed drawings, in which.

DETAILED DESCRIPTION OF THE PREFERRED EMBODIMENTS

With respect to the drawings, only enough of the construction of the invention has been depicted, to simplify the illustrations, as needed for those of ordinary skill in the art to readily understand the underlying principles and concepts of the present invention.

Figure 1A:
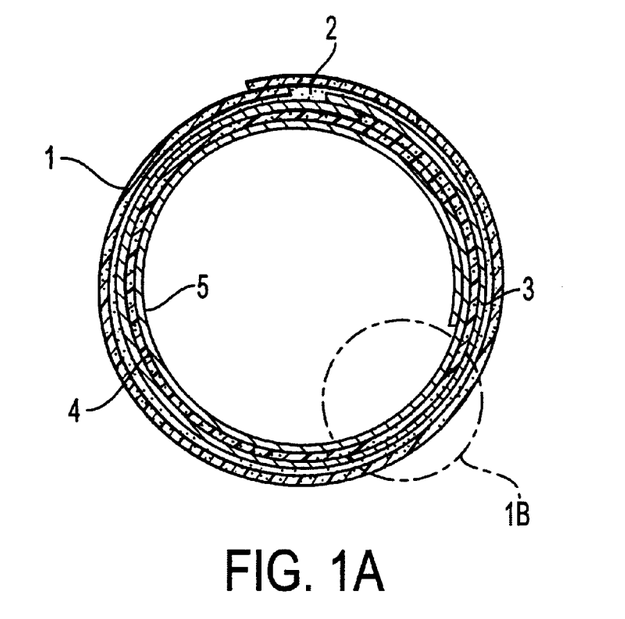
FIG. 1A is a cross-sectional view, illustrating a portion of a coiled repair apparatus according to a first embodiment of the present invention.
Figure 1B:
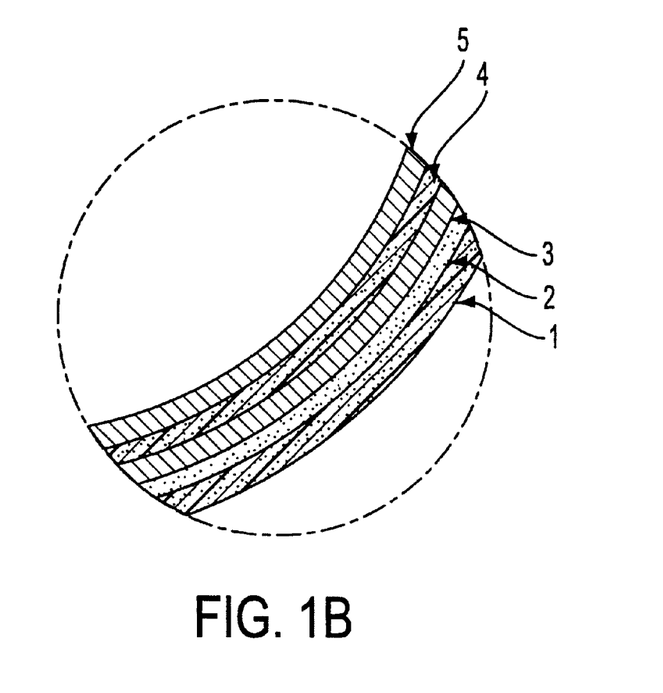
FIG. 1B is a detailed cross-sectional view, taken at the area 1B of FIG. 1A, and which illustrates in detail the construction of the repair apparatus of FIG. 1A.
Figure 2:
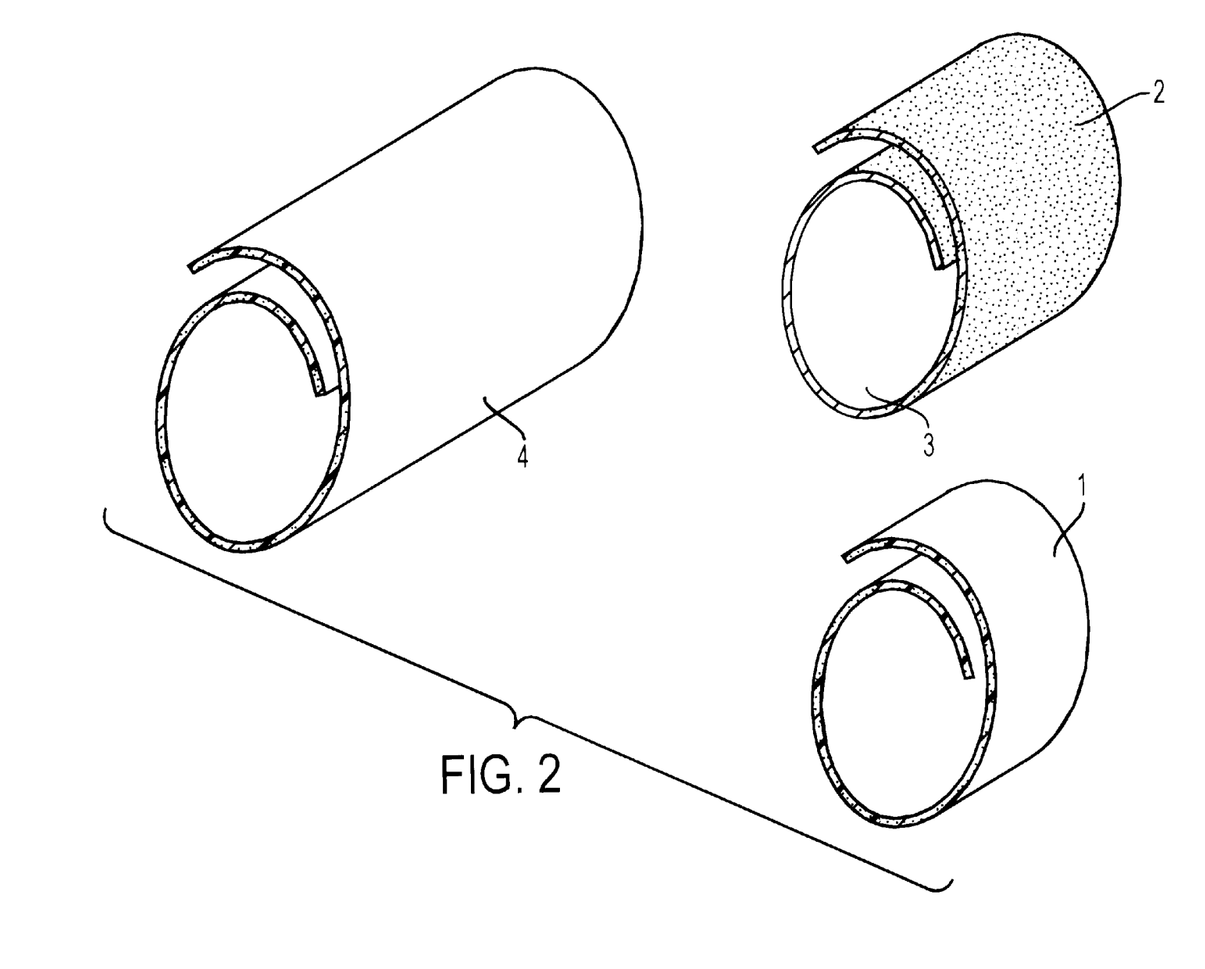
FIG. 2 is an exploded perspective view depicting the resilient, compressible gasket, the sealing member, the curable sealant, and the fiber mesh according to the invention.
Figure 3:
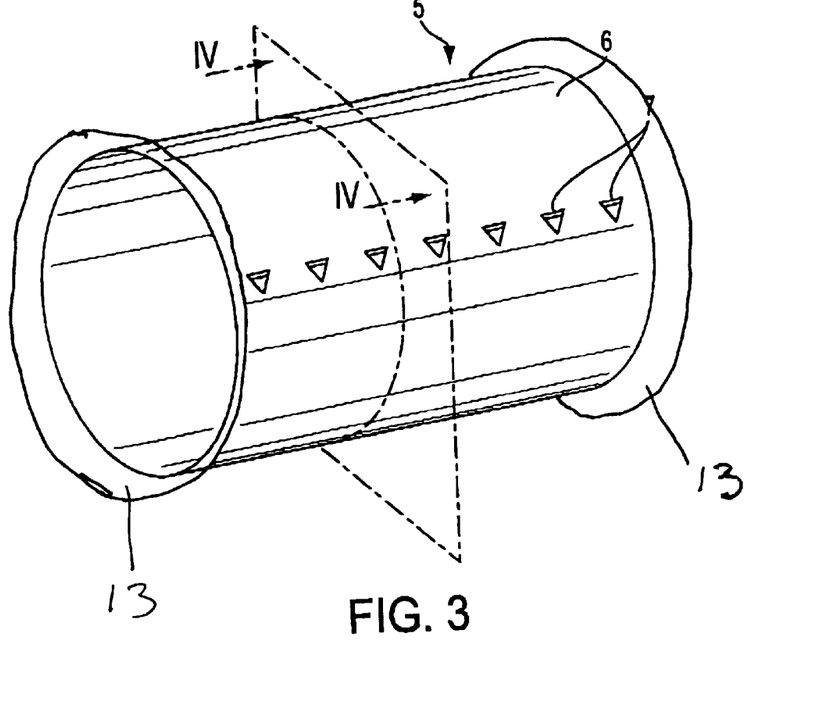
FIG. 3 is a perspective view illustrating locked position of the inner sleeve utilized in the present invention.
Figure 4:
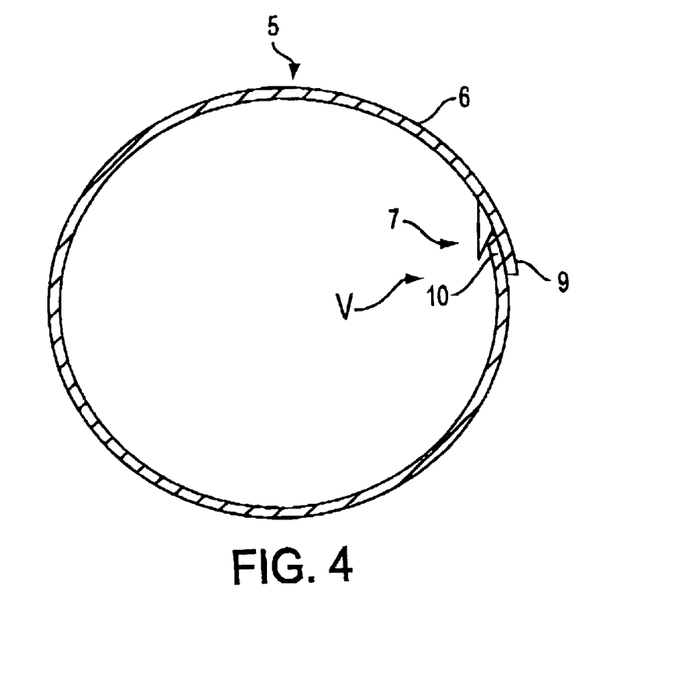
FIG. 4 is a cross-sectional end view, taken along line 4—4 of FIG. 3, which depicts the locked position of the inner sleeve.
Figure 5:
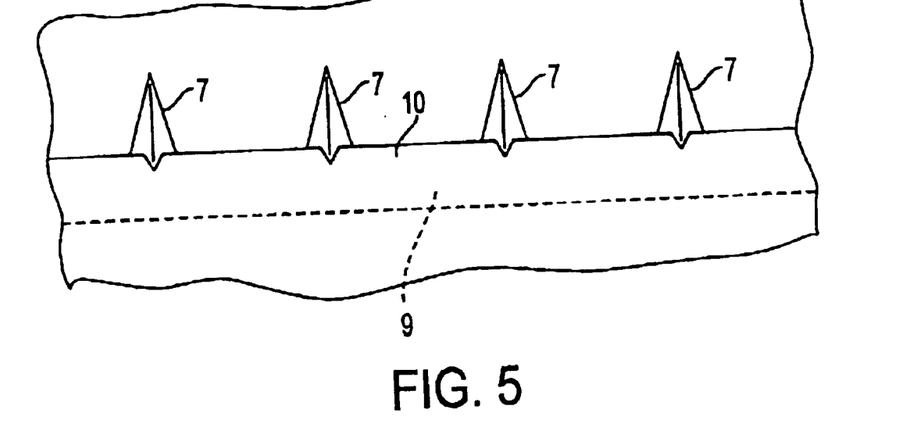
FIG. 5 is a partial plan view of the inner sleeve showing the longitudinal edges thereof and the locking devices to retain the inner sleeve in the locked position.

Referring to FIGS. 1A, 1B, and 2–4, a conduit repair apparatus is disclosed that includes an inner sleeve 5 having an outer surface 6, a pair of longitudinal edges 9, 10, an outwardly flared portion 13 at each longitudinal end of the sleeve (note FIG. 3), and locking members 7 which serve to lock the sleeve into a tubular configuration within an inner surface of a host pipe to be repaired. The sleeve 5 is formed from any resilient material such as stainless steel, carbon steel, or any resilient material suitable for use in repair of a high pressure pipe, such as a gas line, a water line, or a steam line, to hold the repair apparatus in place and protect the repair seal. As can be seen in FIGS. 3–5, the locking members 7 can be deformed from the material forming the sleeve 5, and the sleeve is initially formed as a partially coiled member as shown in FIG. 1A. The sleeve 5 is configured such that when it is located at a position in a host pipe to be repaired and then expanded by a known expansion device, the sleeve 5 takes the configuration shown in FIGS. 3 and 4 wherein the longitudinal edge 10 of the sleeve 5 is engaged with the locking members 7 to retain the sleeve in an expanded tubular configuration.

According to a first embodiment of the invention, a resilient, compressible gasket 4 is applied over the outer surface 6 of the sleeve 5. The resilient, compressible gasket 4, may be formed from a layer of any resilient, compressible material. Preferably, the resilient, compressible gasket 4 may be formed from a closed cell polyethylene or polyurethane foam, or any other type of resilient, compressible foam or other material, such as natural or synthetic rubber having a soft consistency with a rebounding capability, which is capable of exerting pressure between an installed conduit repair sleeve and repair sealant positioned between the sleeve and a host conduit. The resilient, compressible gasket may be applied in any manner, such as by wrapping the resilient, compressible gasket over the sleeve 5.

A sealing membrane 3 as shown in FIGS. 1A, 1B, and 2 is applied over the outer surface of the resilient, compressible gasket 4. The sealing membrane 3 may be applied in any manner, such as by wrapping the sealing membrane over the resilient, compressible gasket 4. The sealing membrane 3 may be formed of any suitable material such as rubber, synthetic elastomer, stainless steel, iron, polyethyleneneoprene, etc. The sealing member 3 is entirely covered with a curable sealant 2, which may be formed as an epoxy resin or any other suitable curable sealant such as polyesters or polyurethanes that can be applied to the sealing membrane and will have a working time preferably ranging from about 20 minutes to about 60 minutes, and with a cure time of about 8 hours to about 24 hours.

A first method of repairing a conduit utilizing the above-described conduit repair apparatus will now be described. First, a repair sleeve 5 is provided with a resilient, compressible gasket 4 on the outer surface thereof, a sealing membrane 3 is provided over the outer surface of the resilient, compressible gasket, and a curable sealant is applied over the sealing membrane. The conduit repair apparatus is then positioned within the host pipe at a site to be repaired, in a manner which is known in the art.

Next, the repair sleeve is expanded, also in a known manner, to engage the locking members 7 to lock the repair sleeve into a tubular configuration. In a known manner, the size of the tubular repair sleeve selected results in a diameter for the tubular configuration of the repair sleeve which is smaller than the diameter of the host pipe but sufficient to compress the resilient, compressible gasket 4 and to press the curable sealant 2 between the inner surface of the host pipe and the sealing membrane. Further, the resilient, compressible gasket 4 must have sufficient resiliency to maintain pressure on the curable sealant 2 and maintain the curable sealant in engagement with the inner surface of the host pipe until the sealant is completely cured.

This method of conduit repair permits the repair sleeve to be positioned at the repair site, expanded into position to force the curable sealant into contact with the inner surface of the host pipe, and the resilient, compressible gasket maintains sufficient pressure of the sealant against the inner surface of the host pipe until the sealant cures and creates a permanent seal. Thus, the entire process of positioning the conduit repair sleeve and expanding the repair sleeve into position can take place in a time frame of about 15 minutes to about 90 minutes, and preferably in less than about one-half hour. Accordingly, the expanding device can be withdrawn and additional repairs may be made to the host pipe in a relatively short period of time.

Thus, the method according to the present invention allows the repair of a 500 foot long pipe section which may include about 45 to 50 joints, all of which may be repaired in less than about one day. This is critical in the repair of utility lines which must be returned to service within less than one day due to agreements with suppliers. Furthermore, multiple sleeves may be installed simultaneously to further reduce installation and repair time.

According to a second embodiment of the invention, a fiber mesh 1, as shown in FIGS. 1A, 1B, and 2, may be applied to the curable sealant 2 in any known manner, such as by wrapping. The fiber mesh 1 permits easier handling of the conduit repair apparatus, and also enables spreading of the curable sealant 2 through the openings in the mesh. This results in a more uniform spreading of the sealant into contact with the inner wall of the host pipe. Additionally, the mesh in combination with the curable sealant, which once cured, creates a member having high tensile strength capable of withstanding the internal pressures of the conduit. Accordingly, the repair sleeve including the fiber mesh can act as an independent pipe within the host pipe. The fiber mesh 1 may be formed of a fiberglass mesh material, or any other suitable material such as a metal mesh, or any suitable mesh having a high modulus of elasticity.

Therefore, according to a second method of the invention, the conduit repair sleeve 5 having the resilient, compressible gasket 4, the sealing membrane 3 and the curable sealant 2 as set forth above would further include a fiber mesh 1 applied over the curable sealant. The fiber mesh 1 allows easier handling of the conduit repair sleeve because the curable sealant is largely covered by the fiber mesh. As the repair sleeve is expanded, the curable sealant is pressed through the openings in the mesh which helps to spread the resin uniformly into engagement with the inner surface of the host pipe. Upon curing of the curable sealant, a permanent, reinforced membrane is created having high tensile strength capable of withstanding the internal pressures of the conduit such that the resulting repair can serve as an independent pipe.

In another embodiment of the present invention, the sleeve 5 and resilient, compressible gasket 4 are configured as set forth above. However, in this embodiment, the sealing membrane 3 is formed from a fiber felt or a fiber mesh, and preferably a fiber felt, which can be formed from any suitable material, such as synthetic fiber materials or glass fiber materials. The curable sealant 2 is formed as a curable liquid resin, such as epoxies, polyesters, and polyurethanes, which is impregnated within the fiber felt. This results in a repair sleeve which can be utilized to effect a repair of any pressure pipe in the manner described above, and is particularly suitable for use in the repair of potable water lines.

Accordingly, a third method of repairing a conduit utilizing the above-described conduit repair sleeve will now be described. First, a repair sleeve 5 is provided with a resilient, compressible gasket 4 on the outer surface thereof. Next, a sealing membrane 3 is impregnated with curable liquid resin, such as epoxies, polyesters, and polyurethanes, and is applied over the outer surface of the resilient, compressible gasket. The conduit repair sleeve is then positioned within the host pipe at a site to be repaired, and is expanded, in the manner described above.

The size of the tubular repair sleeve selected for use in the method results in a diameter of the tubular configuration of the repair sleeve which is smaller than the diameter of the host pipe but sufficient to compress the resilient, compressible gasket 4 and to press the impregnated curable sealant 2 out from the fiber felt sealing membrane 3 and into the area between the inner surface of the host pipe and the sealing membrane. As in the method described previously, the resilient, compressible gasket 4 must have sufficient resiliency to maintain pressure on the curable sealant 2 and impregnated sealing membrane to maintain the curable sealant in engagement with the inner surface of the host pipe until the sealant is completely cured.

As with the first described method, the third method of conduit repair permits the repair sleeve to be positioned at the repair site, expanded into position to force the curable sealant into contact with the inner surface of the host pipe, and the resilient, compressible gasket maintains sufficient pressure of the sealant against the inner surface of the host pipe until the sealant cures and creates a permanent seal. However, since the curable liquid sealant is impregnated within the fiber felt sealing membrane, handling of the repair sleeve is easier, and application of the curable sealant in liquid form is faster, all of which result in reduced repair time as well as reduced repair costs. Thus, the entire process of positioning the conduit repair sleeve and expanding the repair sleeve into position can take place in a time frame of about 15 minutes to about 90 minutes, and preferably in less than about one-half hour and creates a repair conduit that is strong in tension for containing the fluids under high pressure within the host pipe. Accordingly, the expanding device can be withdrawn and additional repairs may be made to the host pipe in a relatively short period of time.

The repair sleeve according to this embodiment, which includes the fiber felt sealing membrane 3 impregnated with liquid curable resin 2, may also include a fiber mesh 1 which may be applied to the outer surface of the impregnated fiber felt. As in the first embodiment, the fiber mesh 1 allows easier handling of the conduit repair sleeve because the curable sealant, in addition to being impregnated in the sealing membrane 3, is largely covered by the fiber mesh. As the repair sleeve is expanded, the curable sealant is pressed from the impregnated sealing membrane 3 and out through the openings in the mesh 1, which helps to spread the resin uniformly into engagement with the inner surface of the host pipe. Upon curing of the curable sealant, a permanent, reinforced membrane is created which has high tensile strength such that the resulting repair can serve as an independent pipe.

Figure 6:
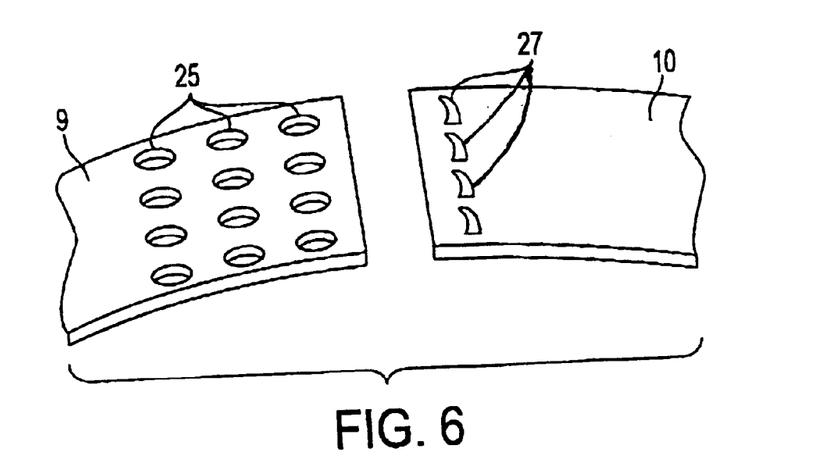
FIGS. 6 and 7 depict the longitudinal edges of the inner sleeve having an alternative locking arrangement according to another embodiment of the invention.
Figure 7:
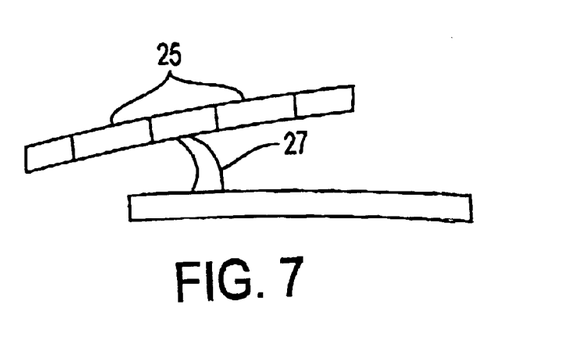

Another embodiment of the present invention is depicted in FIGS. 6 and 7 of the drawings. In this embodiment, an alternative configuration of the inner sleeve 5 is provided in which one longitudinal edge 10 of the sleeve 5 is configured with a plurality of locking projections 27, and the other longitudinal edge 9 of the sleeve 5 is configured with a plurality of rows of holes 25. As will be apparent from observing FIG. 7 of the drawing, as the sleeve 5 of this embodiment is expanded, the locking projections 27 slide from one row to the next during expansion of the sleeve to provide an adjustable diameter for the repair sleeve. The rows of locking holes 25 are spaced apart any suitable distance from one another, preferably by about ⅜ of an inch which provides about ⅛ of an inch of adjustability in the diameter of the sleeve 5 per row of holes 25. However, it will be recognized that the above-noted spacing is merely exemplary, and any suitable spacing may be used to provide any variable diameter deemed necessary by the skilled artisan. Additionally, it can be seen from FIG. 7 that the locking projections 27 are arcuately curved to allow the projections to slide relative to the holes 25 during expansion but resist compression of the sleeve 5 once the projections 27 enter within the holes 25.

Figure 8:
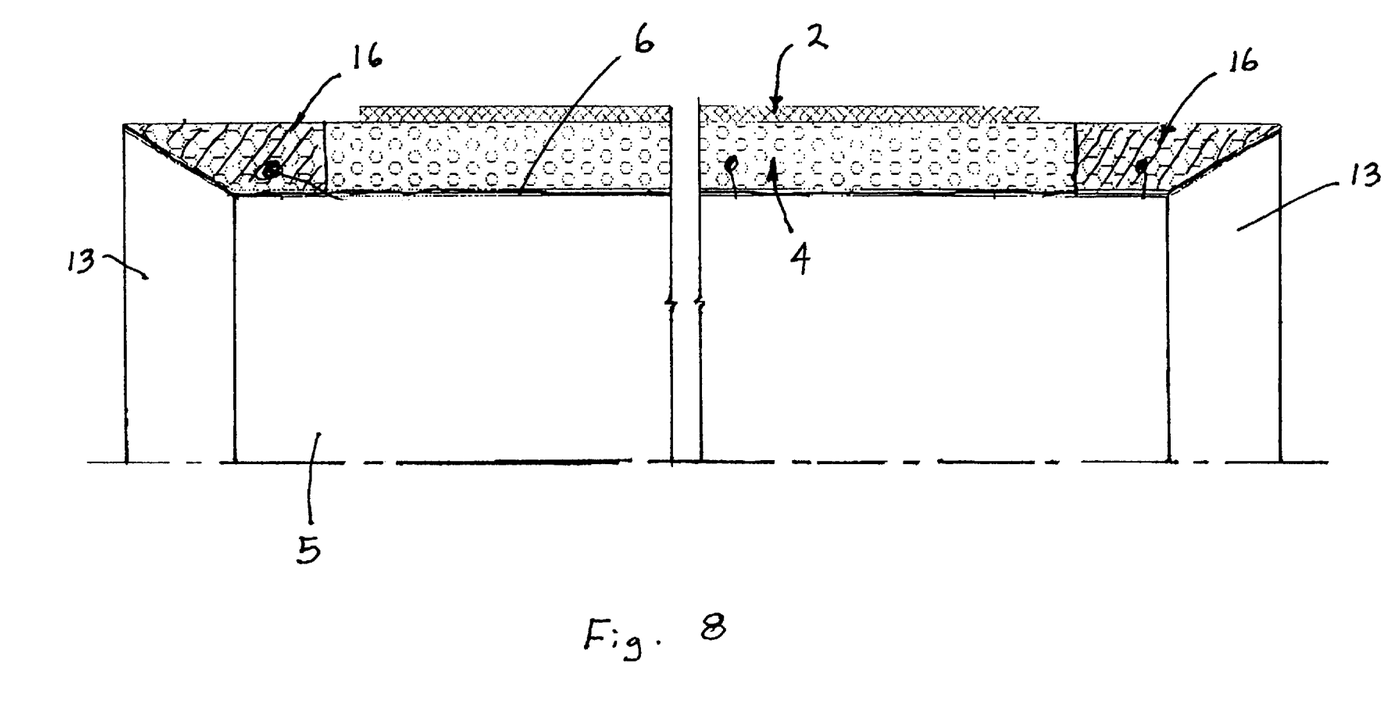
FIG. 8 is a longitudinal cross-sectional view taken along an upper side of the repair apparatus according to another embodiment of the present invention.

In a further embodiment of the present invention depicted in FIG. 8, a conduit repair apparatus is disclosed that is suitable for use in repairing potable water lines., although it is equally suitable for repair of any high pressure conduit. In this embodiment, the conduit repair apparatus includes an inner sleeve 5 having an outer surface 6, a pair of longitudinal edges 9, 10, an outwardly flared portion 13 at each longitudinal end of the sleeve (note FIG. 3), and locking members 7 which serve to lock the sleeve into a tubular configuration within an inner surface of a host pipe to be repaired. The sleeve 5 is formed in the same manner, and functions in the same manner, as in the embodiments previously disclosed, and further description thereof is unnecessary.

According to this embodiment of the invention, a resilient, compressible gasket 4 is applied over the outer surface 6 of the sleeve 5, but is spaced inwardly of the outwardly flared portion at each end of the sleeve 5, as seen in FIG. 8, to define end gasket receiving areas. The resilient, compressible gasket 4, may be formed from a layer of any suitable resilient, compressible material, such as a layer of closed cell polyethylene or polyurethane foam, a layer of cross-linked polyethylene, or any other type of resilient, compressible foam or other material, such as natural or synthetic rubber having a soft consistency with a rebounding capability, which is capable of exerting pressure between an installed conduit repair sleeve and repair sealant positioned between the sleeve and a host conduit. The resilient, compressible gasket may be applied in any manner, such as by wrapping the resilient, compressible gasket over the sleeve 5. The material of the resilient, compressible gasket may also be selected from a material that is safe and suitable for contact with potable water.

Each end gasket receiving area is then provided with an end gasket 16 which is formed from any suitable resilient, compressible material, such as a layer of closed cell polyethylene or polyurethane foam, a layer of cross-linked polyethylene, or any other type of resilient, compressible foam or other material, which is capable of exerting pressure between an installed conduit repair sleeve and repair sealant positioned between the sleeve and a host and that is suitable and safe for contact with potable water. The end gaskets 16 may be applied in any manner, such as by wrapping the material forming the end gaskets over the sleeve 5. Thus, once the repair apparatus is pressed into sealing engagement with the inner surface of the host pipe, the end gaskets and the sleeve 5 isolate the curable sealant 2, which may not be suitable for contact with potable water, from the potable water or other fluid flowing through the repaired conduit.

A method of repairing a conduit utilizing the above-described conduit repair apparatus as depicted in FIG. 8 is as follows. First, a repair sleeve 5 is provided with a resilient, compressible gasket 4 on the outer surface thereof and positioned about the sleeve and spaced inwardly from the outwardly flared portions at each end of the sleeve to define sealant receiving areas at each end of the conduit repair apparatus, and a curable sealant is applied over the resilient, compressible gasket. The end gasket receiving areas are then provided with the end gaskets 16, such as by wrapping the material forming the end gaskets over the sleeve 5. The conduit repair apparatus is then positioned within the host pipe at a site to be repaired, in a manner which is known in the art.

Next, the repair sleeve is expanded in the manner described above, to engage the locking members 7 to lock the repair sleeve into a tubular configuration. This method of conduit repair permits the repair sleeve to be positioned at the repair site, expanded into position to force the curable sealant and the end gaskets into contact with the inner surface of the host pipe, and the resilient, compressible gasket maintains sufficient pressure of the sealant against the inner surface of the host pipe until the sealant cures and creates a permanent seal. Furthermore, once the repair apparatus is pressed into sealing engagement with the inner surface of the host pipe, the end gaskets 16 and the sleeve 5 isolate the curable sealant 2, which may not be suitable for contact with potable water, from the potable water or other fluid flowing through the repaired conduit. Thus, the entire process of positioning the conduit repair sleeve and expanding the repair sleeve into position can take place in a time frame of about 15 minutes to about 90 minutes, and preferably in less than about one-half hour and provides a repair that is suitable for use with potable water. Moreover, as with the previous embodiments, the expanding device can be withdrawn and additional repairs may be made to the host pipe in a relatively short period of time.

According to this embodiment of the present invention, the apparatus and the method of repairing a conduit can further include an outer fiber mesh layer over the curable resin sealant, such that the fiber mesh permits easier handling during the repair process and enables spreading of the curable liquid resin sealant through openings in the mesh for more uniform spreading of the curable liquid resin sealant into contact with the host pipe in the manner described for the embodiments above.

The repair sleeve according to the invention described above can be transported to the site of a repair according to known methods described, for example, in U.S. Pat. No. 5,351,720. For pressure lines according to the present invention, such as natural gas lines, water lines, and steam lines, where the distance between access facilities may be several kilometers or miles, it is desirable to increase the speed of transport of the repair sleeve in view of the fact that the resin in the curable sealant begins to harden over time and in view of the fact that installation costs increase if the time required for completing an installation increases.

Although the invention has been described with reference to particular means, materials and embodiments, it is to be understood that the invention is not limited to the particulars expressly disclosed herein, but the invention extends to all equivalence within the scope of the claims that follow.

What is claimed:

1. An integral conduit repair apparatus comprising:
    a sleeve having an outer surface and a pair of longitudinal edges and a locking structure to lock said sleeve into a tubular configuration within an inner surface of a host pipe to be repaired;
    a resilient, compressible gasket applied over said outer surface of said sleeve;
    a sealing membrane applied over the outer surface of said resilient, compressible gasket; and
    a curable sealant applied over said sealing membrane, wherein said integral conduit repair apparatus is insertable as a unit within the host pipe to be repaired, and said sealant is adapted to be pressed by said resilient, compressible gasket between said outer surface of said sleeve and the inner surface of the host pipe while said sealant is cured.

2. A conduit repair apparatus according to claim 1, wherein:
    said resilient, compressible gasket comprises a layer of one of a closed cell polyethylene foam and a closed cell polyurethane foam.

3. A conduit repair apparatus according to claim 1, wherein:

said curable sealant comprises one of an epoxy, a polyester, and a polyurethane.

4. A conduit repair apparatus according to claim 1, further comprising:

an outer fiber mesh layer adapted to be applied over said sealant, wherein said fiber mesh permits easier handling and enables spreading of said sealant through openings in the mesh for more uniform spreading of said sealant into contact with the host pipe.

5. A conduit repair apparatus according to claim 4, wherein:

said resilient, compressible gasket comprises a layer of one of a closed cell polyethylene foam and a closed cell polyurethane foam.

6. A conduit repair apparatus according to claim 4, wherein:

said curable sealant comprises one of an epoxy, a polyester, and a polyurethane.

7. An integral conduit repair apparatus comprising:

a sleeve having an outer surface and a pair of longitudinal edges and a locking structure to lock said sleeve into a tubular configuration within an inner surface of a host pipe to be repaired;

a resilient, compressible gasket applied over said outer surface of said sleeve;

a sealing membrane comprising a porous material impregnated with a curable liquid resin sealant, said membrane applied over the outer surface of said resilient, compressible gasket;

wherein said integral conduit repair apparatus is insertable as a unit within the host pipe to be repaired, whereby said curable sealant is pressed by said resilient, compressible gasket between said outer surface of said sleeve and the inner surface of the host pipe while said sealant is cured.

8. A conduit repair apparatus according to claim 7, wherein:

said resilient, compressible gasket comprises a layer of one of a closed cell polyethylene foam and a closed cell polyurethane foam.

9. A conduit repair apparatus according to claim 7, wherein:

said curable sealant comprises an epoxy.

10. A conduit repair apparatus according to claim 7, further comprising:

an outer fiber mesh layer adapted to be applied over said sealant, wherein said fiber mesh permits easier handling and enables spreading of said sealant through openings in the mesh for more uniform spreading of said sealant into contact with the host pipe.

11. A conduit repair apparatus according to claim 10, wherein:

said resilient, compressible gasket comprises a layer of one of a closed cell polyethylene foam and a closed cell polyurethane foam.

12. A conduit repair apparatus according to claim 10, wherein:

said curable sealant comprises one of an epoxy, a polyester, and a polyurethane.

13. A conduit repair apparatus according to claim 10, wherein:

said locking structure comprises at least one row of lock holes provided parallel to one of the pair of longitudinal edges of said sleeve, and at least one row of locking projections provided on the other of the pair of longitudinal edges of said sleeve to interengage with said lock holes upon expansion of the sleeve to a position to cause said resilient, compressible gasket to press the sealant between said outer surface of said sleeve and the inner surface of the host pipe while said sealant is cured.

14. A conduit repair apparatus according to claim 13, wherein:

said locking structure comprises a plurality of spaced rows of lock holes.

15. A conduit repair apparatus according to claim 14, wherein:

said plurality of spaced rows of locking holes are spaced apart by about $3/8$ inch from one another, thereby permitting the diameter of said sleeve to increase as said locking projections slip from one row to the next during expansion of the sleeve.

16. A method of repairing a conduit comprising:

providing an integral conduit repair sleeve having an outer surface, a pair of longitudinal edges and a locking structure to lock said repair sleeve into a tubular configuration within an inner surface of a host pipe to be repaired, said repair sleeve assuming a coiled position and adapted to assume an expanded locked position;

applying a resilient, compressible gasket over said outer surface of said repair sleeve;

applying a sealing membrane over the outer surface of said resilient, compressible gasket;

applying a curable sealant over said sealing membrane;

inserting said integral conduit repair sleeve as a unit, with said gasket, said sealing membrane and said sealant applied thereto, within the host pipe at a site to be repaired;

expanding said repair sleeve to engage the locking structure to lock said repair sleeve into a tubular configuration, to compress said resilient, compressible gasket, and to press said curable sealant between the inner surface of the host pipe and said sealing membrane; and maintaining pressure on said curable sealant during curing by outwardly directed pressure exerted by said compressed resilient, compressible gasket between said sleeve and said sealant.

17. A method of repairing a conduit according to claim 16, wherein:

said resilient, compressible gasket comprises a layer of one of a closed cell polyethylene foam and a closed cell polyurethane foam.

18. A method of repairing a conduit according to claim 16, wherein:

said curable sealant comprises one of an epoxy, a polyester, and a polyurethane.

19. A method of repairing a conduit according to claim 16, further comprising:

applying an outer fiber mesh layer over said sealant, wherein said fiber mesh permits easier handling and enables spreading of said sealant through openings in the mesh for more uniform spreading of said sealant into contact with the host pipe.

20. A method of repairing a conduit according to claim 19, wherein:

said resilient, compressible gasket comprises a layer of one of a closed cell polyethylene foam and a closed cell polyurethane foam.

21. A method of repairing a conduit according to claim 19, wherein:
said curable sealant comprises one of an epoxy, a polyester, and a polyurethane.

22. A method of repairing a conduit comprising:
providing an integral conduit repair sleeve having an outer surface, a pair of longitudinal edges and a locking structure to lock said repair sleeve into a tubular configuration within an inner surface of a host pipe to be repaired, said repair sleeve assuming a coiled position and adapted to assume an expanded locked position;
applying a resilient, compressible gasket over said outer surface of said repair sleeve;
applying a sealing membrane comprising a porous material impregnated with a curable liquid resin sealant over the outer surface of said resilient, compressible gasket;
inserting said integral conduit repair sleeve, as a unit, with said gasket, said sealing membrane and said sealant applied thereto, within the host pipe at a site to be repaired;
expanding said repair sleeve to engage the locking structure to lock said repair sleeve into a tubular configuration, to compress said resilient, compressible gasket, and to press said sealing membrane and said curable liquid resin sealant between the inner surface of the host pipe and said sealing membrane; and
maintaining pressure on said sealing membrane and said curable liquid resin sealant during curing by outwardly directed pressure exerted by said compressed resilient, compressible gasket between said sleeve and said sealant.

23. A method of repairing a conduit according to claim 22, wherein:
said resilient, compressible gasket comprises a layer of one of a closed cell polyethylene foam and a closed cell polyurethane foam.

24. A method of repairing a conduit according to claim 22, wherein:
said curable liquid resin sealant comprises one of an epoxy, a polyester, and a polyurethane.

25. A method of repairing a conduit according to claim 22, further comprising:
applying an outer fiber mesh layer over said curable liquid resin sealant, wherein said fiber mesh permits easier handling and enables spreading of said curable liquid resin sealant through openings in the mesh for more uniform spreading of said curable liquid resin sealant into contact with the host pipe.

26. A method of repairing a conduit according to claim 25, wherein:
said resilient, compressible gasket comprises a layer of one of a closed cell polyethylene foam and a closed cell polyurethane foam.

27. A method of repairing a conduit according to claim 25, wherein:
said curable liquid resin sealant comprises one of an epoxy, a polyester, and a polyurethane.

28. A method of repairing a conduit according to claim 25, wherein:
said locking structure comprises at least one row of lock holes provided parallel to one of the pair of longitudinal edges of said sleeve,
and at least one row of locking projections provided on the other of the pair of longitudinal edges of said sleeve to interengage with said lock holes upon expansion of the sleeve to a position to cause said resilient, compressible gasket to press the sealant between said outer surface of said sleeve and the inner surface of the host pipe while said sealant is cured.

29. A method of repairing a conduit according to claim 28, wherein:
said locking structure comprises a plurality of spaced rows of lock holes.

30. A method of repairing a conduit according to claim 29, wherein:
said plurality of spaced rows of locking holes are spaced apart by about 3/8 inch from one another, thereby permitting the diameter of said sleeve to increase as said locking projections slip from one row to the next during expansion of the sleeve.

31. An integral conduit repair apparatus comprising:
a sleeve having an outer surface, a pair of longitudinal edges, an outwardly flared portion at each longitudinal end of the sleeve, and a locking structure to lock said sleeve into a tubular configuration within an inner surface of a host pipe to be repaired;
a resilient, compressible gasket applied over said outer surface of said sleeve; and
a curable sealant applied over said resilient, compressible gasket, wherein said integral conduit repair apparatus is insertable as a unit within the host pipe to be repaired, and said sealant adapted to be pressed by said resilient, compressible gasket between said outer surface of said sleeve and the inner surface of the host pipe while said sealant is cured;
said resilient, compressible gasket and said curable sealant being positioned about said sleeve and spaced inwardly from the outwardly flared portions at each end of said sleeve to define end gasket receiving areas at each end of the conduit repair apparatus.

32. A conduit repair apparatus comprising:
a sleeve having an outer surface, a pair of longitudinal edges, an outwardly flared portion at each longitudinal end of the sleeve, and a locking structure to lock said sleeve into a tubular configuration within an inner surface of a host pipe to be repaired:
a resilient, compressible gasket adapted to be applied over said outer surface of said sleeve;
a curable sealant adapted to be applied over said resilient, compressible gasket, said sealant adapted to be pressed by said resilient, compressible gasket between said outer surface of said sleeve and the inner surface of the host pipe while said sealant is cured;
said resilient, compressible gasket and said curable sealant being positioned about said sleeve and spaced inwardly from the outwardly flared portions at each end of said sleeve to define end gasket receiving areas at each end of the conduit repair apparatus; and
wherein an end gasket is provided in and encircles each said end gasket receiving area, said end gaskets being formed of a material suitable for contact with potable water, whereby once the repair apparatus is pressed into sealing engagement with the inner surface of the host pipe, said end gaskets and said sleeve isolate said curable sealant from a fluid flowing through the repair apparatus.

33. A conduit repair apparatus according to claim 32, wherein:
wherein said end gaskets are formed from a resilient, compressible material, which is suitable and safe for contact with potable water, including one of a closed cell polyethylene foam, a closed cell polyurethane foam, and a layer of cross-linked polyethylene.

34. A conduit repair apparatus according to claim 32, wherein:

said resilient, compressible gasket comprises a layer of one of a closed cell polyethylene foam and a closed cell polyurethane foam.

35. A conduit repair apparatus according to claim 32, wherein:

said curable sealant comprises one of an epoxy, a polyester, and a polyurethane.

36. A conduit repair apparatus according to claim 32, further comprising:

an outer fiber mesh layer adapted to be applied over said sealant, wherein said fiber mesh permits easier handling and enables spreading of said sealant through openings in the mesh for more uniform spreading of said sealant into contact with the host pipe.

37. A conduit repair apparatus according to claim 36, wherein:

said resilient, compressible gasket comprises a layer of one of a closed cell polyethylene foam and a closed cell polyurethane foam.

38. A conduit repair apparatus according to claim 36, wherein:

said curable sealant comprises one of an epoxy, a polyester, and a polyurethane.

39. A method of repairing a conduit comprising:

providing an integral conduit repair sleeve having an outer surface, a pair of longitudinal edges, an outwardly flared portion at each longitudinal end of the sleeve, and a locking structure to lock said repair sleeve into a tubular configuration within an inner surface of a host pipe to be repaired, said repair sleeve assuming a coiled position and adapted to assume an expanded locked position;

applying a resilient, compressible gasket over said outer surface of said repair sleeve;

applying a curable sealant over said resilient, compressible gasket;

said resilient, compressible gasket and said curable sealant being positioned about said sleeve and spaced inwardly from the outwardly flared portions at each end of said sleeve to define end gasket receiving areas at each end of the conduit repair apparatus;

inserting said integral conduit repair sleeve, as a unit, with said gasket and said sealant applied thereto, within the host pipe at a site to be repaired;

expanding said repair sleeve to engage the locking structure to lock said repair sleeve into a tubular configuration, to compress said resilient, compressible gasket, and to press said curable sealant between the inner surface of the host pipe and the outer surface of said sleeve; and maintaining pressure on said curable sealant during curing by outwardly directed pressure exerted by said compressed resilient, compressible gasket between said sleeve and said sealant.

40. A method of repairing a conduit comprising:

providing a conduit repair sleeve having an outer surface, a pair of longitudinal edges, an outwardly flared portion at each longitudinal end of the sleeve, and a locking structure to lock said repair sleeve into a tubular configuration within an inner surface of a host pipe to be repaired, said repair sleeve assuming a coiled position and adapted to assume an expanded locked position;

applying a resilient, compressible gasket over said outer surface of said repair sleeve;

applying a curable sealant over said resilient, compressible gasket;

said resilient, compressible gasket and said curable sealant being positioned about said sleeve and spaced inwardly from the outwardly flared portions at each end of said sleeve to define end gasket receiving areas at each end of the conduit repair apparatus;

positioning said conduit repair sleeve within the host pipe at a site to be repaired;

expanding said repair sleeve to engage the locking structure to lock said repair sleeve into a tubular configuration, to compress said resilient, compressible gasket, and to press said curable sealant between the inner surface of the host pipe and the outer surface of said sleeve;

maintaining pressure on said curable sealant during curing by outwardly directed pressure exerted by said compressed resilient compressible gasket between said sleeve and said sealant; and providing an end gasket for each said end gasket receiving area, said end gaskets encircling said sleeve and being formed of a material suitable for contact with potable water, whereby once the repair apparatus is pressed into sealing engagement with the inner surface of the host pipe, said end gaskets and said inner sleeve isolate said curable sealant from a fluid flowing through the repair apparatus.

41. A method of repairing a conduit according to claim 40, wherein:

wherein said end gaskets are formed from a resilient, compressible material, which is suitable and safe for contact with potable water, including one of a closed cell polyethylene foam, a closed cell polyurethane foam, and a layer of cross-linked polyethylene.

42. A method of repairing a conduit according to claim 40, wherein:

said resilient, compressible gasket comprises a layer of one of a closed cell polyethylene foam and a closed cell polyurethane foam.

43. A method of repairing a conduit according to claim 40, wherein:

said curable sealant comprises one of an epoxy, a polyester, and a polyurethane.

44. A method of repairing a conduit according to claim 40, further comprising:

applying an outer fiber mesh layer over said sealant, wherein said fiber mesh permits easier handling and enables spreading of said sealant through openings in the mesh for more uniform spreading of said sealant into contact with the host pipe.

45. A method of repairing a conduit according to claim 44, wherein:

said resilient, compressible gasket comprises a layer of one of a closed cell polyethylene foam and a closed cell polyurethane foam.

46. A method of repairing a conduit according to claim 44, wherein:

said curable sealant comprises one of an epoxy, a polyester, and a polyurethane.

* * * * *